Oct. 27, 1931.  R. E. BRUCKNER  1,829,261

POWER TRANSMITTING MECHANISM

Filed Sept. 22, 1926  3 Sheets-Sheet 1

FIG.1.

INVENTOR.
Robert Carll Bruckner
ATTORNEYS.

Oct. 27, 1931.  R. E. BRUCKNER  1,829,261
POWER TRANSMITTING MECHANISM
Filed Sept. 22, 1926  3 Sheets-Sheet 2

INVENTOR.
Robert Earll Bruckner
BY
ATTORNEYS.

Patented Oct. 27, 1931

1,829,261

UNITED STATES PATENT OFFICE

ROBERT EARLL BRUCKNER, OF HASTINGS-ON-HUDSON, NEW YORK

POWER TRANSMITTING MECHANISM

Application filed September 22, 1926. Serial No. 137,158.

The present invention comprises a system for the pneumatic transmission of the power from a prime mover, such as a combustion engine, to a load requiring sensitive variation of speed and torque, and usually also quick reversal, such as rolling mills, locomotives and the like.

The objects of the present invention are: to reduce the size of compressor required to absorb the power of a given engine; to increase the compressor speed, eliminating the necessity for speed-reduction between the engine and compressor; to increase the efficiency of transmission, primarily by reducing the number of working parts between the expanding engine fluid and the transmission fluid being compressed; to reduce the danger of explosions of lubricant vapor; to reduce the bulk of the pneumatic motor required for complete expansion of the transmission fluid; to increase the efficiency at starting, with motor cutoff set late to provide sufficient starting torque; to eliminate the chilling of the motor lubricant due to expansion of the transmission fluid; to simplify the governing system, providing torque and speed adjustment by operator control of engine speed to vary the motor speed. Other objects of the present invention will be evident from the following description.

While described primarily as cooperating with an internal combustion engine of the Otto type, the present invention is applicable to combustion engines generally. The specific manner of use with any particular combustion engine will, from the following description, be evident to those skilled in the design of the engine.

Features and details of the invention will appear from the specification and claims.

A preferred embodiment of the invention is illustrated in the accompanying drawings as follows.

Figure 1:
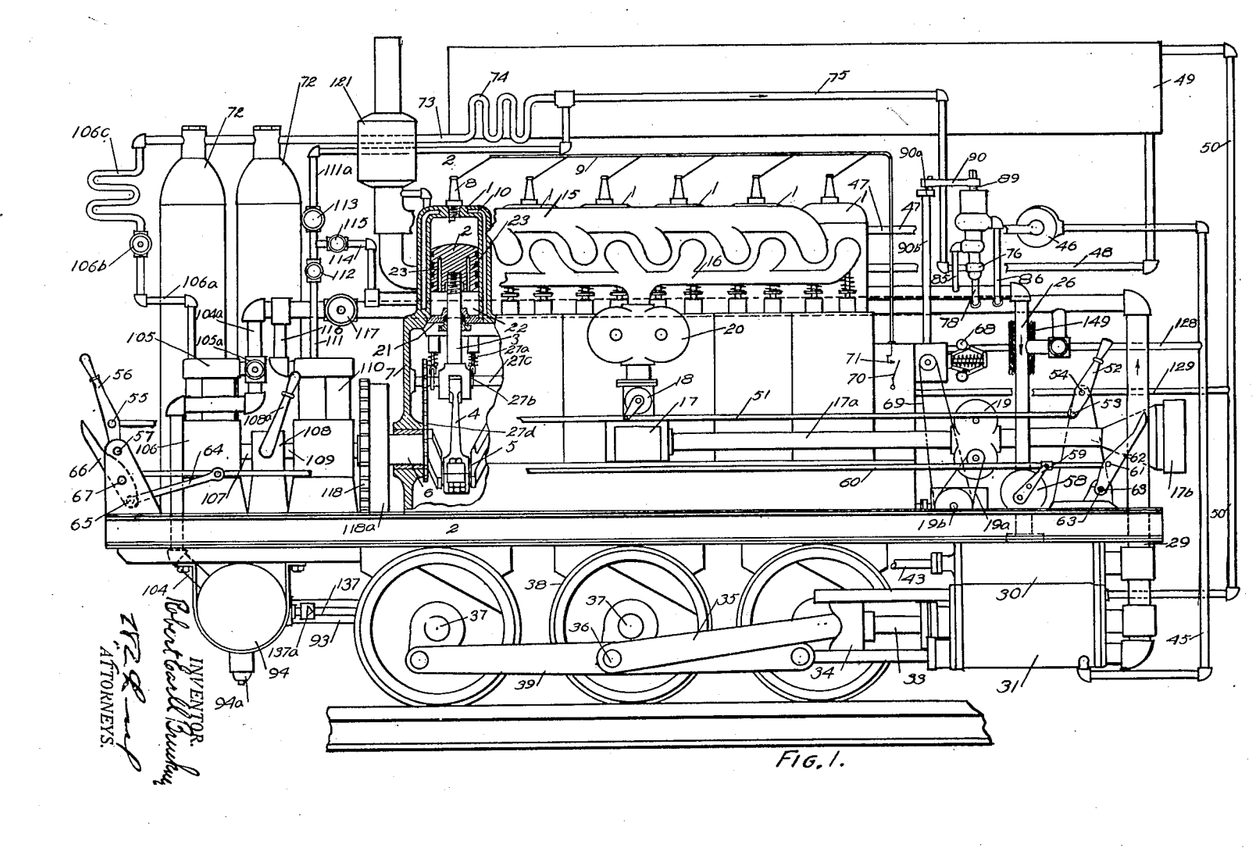
Fig. 1 shows a side elevation of a locomotive, partly in section, embodying the invention.
Figure 2:
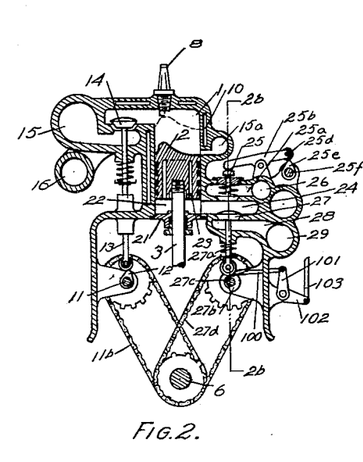
Fig. 2 a sectional view of one of the engine cylinders and its valve mechanism on the line 2—2 in Fig. 2b.

The primary motor is preferably made up of a plurality of cylinders 1. These are provided with pistons 2, the piston rods 3, connecting rods 4, and cranks 5 mounted on crank shaft 6. The crank shaft 6 is carried in bearings in a frame 7 on which the cylinders are mounted. Ignition plugs 8 are of the usual type and supplied through the wiring 9. A water jacket 10 of the usual construction is provided for the cylinder. An engine cam shaft 11 is driven by a sprocket gearing 11b from the crank shaft. The cam shaft is provided with cams 12 which actuate push rods 13, the push rods carrying inlet and exhaust valves 14, the exhaust valve appearing in the section in Fig. 2. The exhaust valves lead to an exhaust manifold 15 and an inlet manifold 16 is provided for the inlet. An auxiliary exhaust port 15a is provided for each of the cylinders, the cam timing as shown in Fig. 2 being arranged for a two-stroke cycle engine. A carburetor 17 is of the usual type and has its intake for air through a pipe 17a with the usual inlet opening 17b and a throttle valve 18 is provided at the discharge side of the carburetor in the usual manner. Preferably the engine is provided with superchargers 19 and 20, the supercharger 19 being driven through a chain gearing 19a from a shaft 19b driven from the engine shaft, the supercharger 20 being similarly driven from the engine cam shaft by a gearing (not shown).

The lower ends of the cylinders are closed by covers 21 providing the compressor chambers 22. The lower face of the piston is provided with annular fins 23 to increase the surface and consequently the heat transfer by way of the piston. The compressor chamber has a discharge port 24 and this leads to a passage 25a which is controlled by a discharge valve 25. The passage 25a leads to a discharge pipe 26. An inlet valve 27 controls the connection between the port 24 and an inlet passage 28 leading from an inlet pipe 29. The valve 27 is provided with a stem 27a which is operated by a cam 27b carried by a cam shaft 27c and the cam shaft is driven by a sprocket and chain 27d from the crank shaft.

Preferably also the discharge valve 25 is positively closed. This is accomplished by a rock arm 25b which operates on the upper end of the valve stem of the valve 25. The rock arm is mounted on a shaft 25c and is provided with a cam roller 25d. A cam 25e operates on the roller 25d to rock the shaft 25c. The cam is carried by a cam shaft 25f and the cam shaft is operated through a chain 25g from the cam shaft 27c. The closing cam 25e operates on the valve only momentarily and the valve is relieved of the weight of the rocker immediately through the action of the spring 25h so that immediately the valve is subjected to a pressure opening it for discharge it is relieved of the rocker arm pressure. The valve is preferably provided with a spring 25i which tends to lift the valve, the tension of the spring balancing the weight of the valve parts to make the valve sensitive.

The pneumatic motor may be of any preferred type. As shown the pipes 26 and 29 lead to and from a valve chest 30 of the motor, the valve chest being arranged on a cylinder 31. A piston 32 operates in the cylinder and is provided with a piston rod 33 extending to a cross head 34. A pitman 35 extends from the cross head to one of the cranks 36 carried on the driving axles 37. Driving wheels 38 are mounted on the axles and the different cranks are connected by the side rods 39. An ordinary slide valve, of the plug type, 40 is arranged in the valve chest and this has the controlling ends 41 operating over ports 42 leading to the cylinder. The valve is provided with a valve stem 43 which is connected with any suitable valve gear, preferably a reversing variable cut-off valve gear (not shown).

The cylinder preferably has a water jacket 44 and this water jacket has a pipe 45 leading from a centrifugal pump 46, the centrifugal pump being connected by a pipe 47 with the water jackets 10 of the engine cylinders. A pipe 48 leads to the water jackets 10 from a radiator 49 and a pipe 50 leads from the jacket 44 to the radiator so that the pneumatic motor cylinders are warmed by the heat from the cylinders of the internal combustion engine, this heat transfer being accomplished through the liquid kept in circulation by the centrifugal pump. The centrifugal pump may be driven by any convenient mechanism (not shown).

It is desirable that the throttle be operated from either end of the locomotive. To that end the throttle lever is connected by the rod 51 with the lever 52 at 53 below the pivotal mounting 54 of the lever 52 and at the opposite end of the locomotive at 55 with the lever 56, the lever 56 being mounted at 57 below the rod. In this way an inward movement of either the lever 52 or 56 in the same direction results in the same control movement of the throttle. It is desirable also for the purpose of quickly stopping the pneumatic motor to provide a throttle in the pipe 26 leading to the valve chest. Such a throttle 58 is here provided. It has a control lever 59 and here also it is desirable to control this from either end of the locomotive with a movement of a controlling lever (pedal actuated) in the same direction. A rod 60 is connected to the throttle lever, 59, and at 61 to a pedal lever 62, the pedal lever being pivotally mounted at 63 below point 61. At the opposite end of the rod 60 a link 64 connects the rod 60 with a pedal lever 66 at 65 below a pivotal mounting 67. Consequently a downward movement of the levers 62 and 66 results in a similar movement of the throttle lever 59.

It is desirable to supply the device with a safety governor for reasons hereinafter described. Such a governor is provided in the form of a centrifugal governing mechanism 68 which is driven by a chain 69 from the shaft 19b. The stem of the centrifugal governing mechanism operates upon a switch 70 acting on terminals 71 controlling the ignition system.

It will be understood that it is desirable to maintain a definite quantity of actuating fluid in the transmission system. This is accomplished in the present invention by a mean pressure controlling mechanism shown in detail in Fig. 3. Preferably the fluid medium is $CO_2$ and this is stored in liquid form in containers 72. A pipe 73 leads from the containers 72 to a warming coil 74, the coil 74 being warmed by atmosphere so as to convert the wet vapor given off from the containers into a comparatively dry gas. This coil is connected by a pipe 75 with a chamber 76. The chamber is connected through a valve opening 77 with a pipe 78, the pipe 78 leading to the low pressure pipe 29. A valve 79 controls the passage 77. It is provided with a stem 80. The stem is connected to two operating pistons 81 and 82 subjected to pressures from chambers 83 and 84 respectively. The chamber 83 is connected by a pipe 85 with the high pressure pipe 26 and the chamber 84 by a pipe 86 with the low pressure pipe 29. The chamber 83 is closed against the chamber 76 by a closure plunger 87. A spring 88 exerts downward pressure on the valve and tends to open it while the pistons 81 and 82 tend to close it.

Figure 2A:
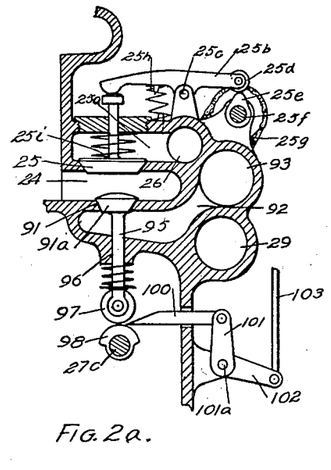
Fig. 2a a section on the line 2a—2a in Fig. 2b.

This apparatus is designed to maintain an approximately constant quantity of operating fluid in the circuit. The effective area of the pistons 81 and 82, therefore, should be so proportioned that the sum of the pressures on the pistons operating in conjunction with the spring affect this result. To this end the area of the piston 81 should be proportioned to the effective area of the piston 82 as the volume of the high pressure side is to the volume of the low pressure side, changing this proportion slightly to compensate for differences in absolute mean operating temperature of the fluid on the two sides. In this way the total quantity of fluid in the circuit may be maintained approximately constant. In order to make the device more sensitive I prefer to provide an extension 89 above the upper piston 82 and oscillate the pistons through an arm 90 actuated by a crank 90a mounted on a shaft 90b driven from the governor 68. In order to start the engine I prefer to utilize the compressor system as a motor for starting the engine. This can be readily accomplished by the valve mechanism illustrated in Figs. 2, 2a and 2b. An auxiliary starting passage 91 leads from the port 24 to a passage 92, the passage 92 leading by a pipe 93 to a low pressure receiver 94. The passage 91 is controlled by a valve 91a and this is provided with a stem 95 operating in a guide 96. The stem 95 has a cam roller 97 at its lower end which is adapted to be operated by a cam 98 on the shaft 27c. A wedge piece 100 is adapted to be interposed between the end of the roller 97 and the cam 98 so as to impart to the valve 91 action from the cam 98. The wedge piece is carried by a rock arm 101. The rock arm is mounted on a shaft 101a. A rock arm 102 extends from the shaft 101a and is operated by a control rod 103. When, therefore, it is desired to start the engine it is only necessary to throw in the wedge pieces 100. Some of these wedge pieces due to the timing will open at least one of the valves 91 thus exhausting fluid from the compressor chamber controlled by that particular valve, thus releasing the pressure under the piston of that particular unit. This will unbalance the units relatively to each other and the pressure fluid operating under the pistons of other units of the engine will force those pistons up, thus turning the engine over, the valves 91 being timed to operate the units in succession to accomplish this result in the ordinary manner, the opening of the valve 91 being coincident with the closing of the intake valve 27.

It will be observed that the constant-fluid controlling mechanism through the valve 79 will add fluid to the system to compensate for any fluid exhausted in the starting operation. In order that the receiver 94 may be certainly maintained at a pressure low enough to accomplish the starting should this be retarded, a blow-off valve 94a is provided operating at a desired maximum pressure in the receiver 94.

It is desirable to return the fluid collected in the receiver 94 to the storage containers, or bottles 72. To this end the following mechanism is provided: A pipe 104 leads from the receiver 94 to a valve chamber 105 of a compressor 106. The compressor 106 is driven from a shaft 107. The shaft 107 is driven from a shaft 109 through a clutch 108. The shaft 109 is a part of, or connected with, the power shaft of the starting motor 110. The motor 110 is fluid driven and gets its supply by way of a pipe 111. The pipe 111 is connected by a pipe 114 with the high pressure pipe 26. The pipe 111 is also connected by way of a pipe 111a with the pipe 75. A valve 112 is arranged in the pipe 111 and a valve 115 in the pipe 114 and a valve 113 in the pipe 111a, the connection of the pipe 114 with the pipe 111 being between the valves 112 and 113. When the engine is running and the starting motor is operated the valve 113 is closed and the valves 112 and 115 are open. Under these conditions, the exhaust from the starting motor 110 is carried by way of a pipe 116 to the low pressure pipe 29. A valve 117 is arranged in this pipe and is open as the motor is operated under the conditions just expressed. As the motor is operated and the compressor 106 actuated fluid is pumped from the receiver 94 and is discharged from the compressor through a pipe 106a to the containers, or bottles 72. The pipe 106a is provided with a valve 106b which may be closed when the compressor is idle and the pipe is also provided with a cooling coil 106c. It may be desirable to use the starting motor 110 to start the engine as distinguished from the valve action illustrated in Figs. 2, 2a and 2b. Under these conditions the valve 115 is closed and the valve 113 opened. Thus fluid direct from the pipe 75 is delivered to the starting motor 110 and under these conditions exhaust from the motor is delivered to the low pressure receiver 94 and the valve 117 is closed. A pipe 104a leads from the pipe 104 to the exhaust pipe 116 and a three-way valve 105a is arranged between the pipe 104 and 104a. The valve 105a is turned to close the passage into the valve chest 105 and open the connection between the pipe 104 and 104a so that the exhaust from the motor 110 takes place through the pipe 116, pipe 104a, pipe 104 to the low pressure receiver. A gear 118 is mounted on a fly wheel 118a of the crank shaft 6. A gear 119 driven from the shaft 109 of the engine operates on the gear 118. The gear 119 is controlled by any desired starting connection 120 which releases the connection with a driving speed of the gear 118.

Figures 5, 6, 8, 9:
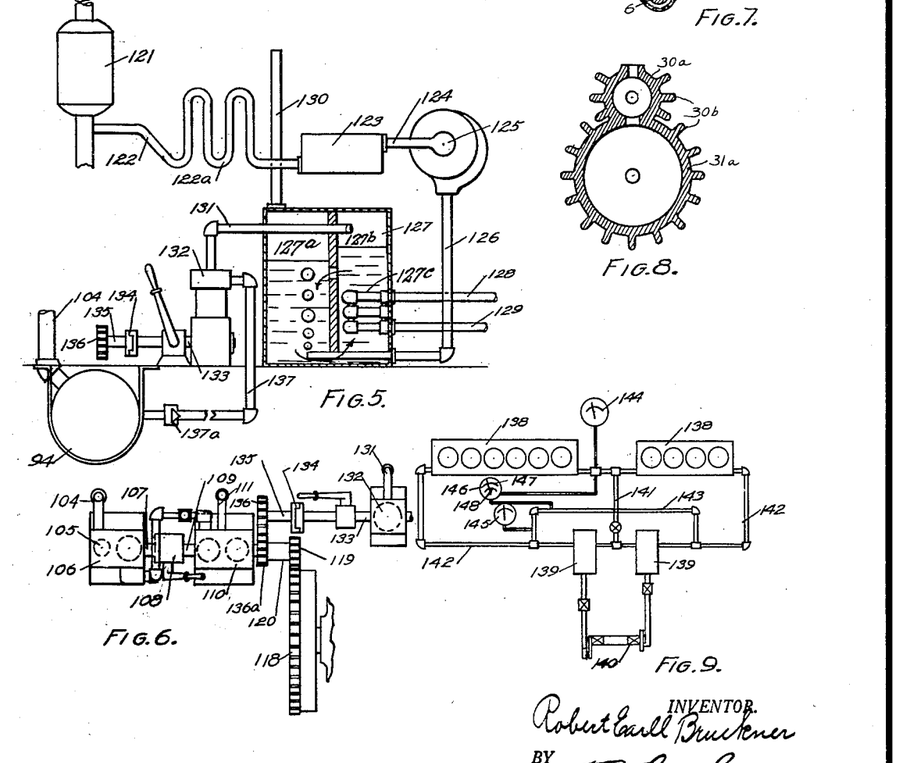
Fig. 5 an elevation of a fluid replenishing apparatus.
Fig. 6 a plan view of the starting compressor, starting motor and replenishing compressor.
Fig. 8 a central section of an alternative form of pneumatic motor cylinder.
Fig. 9 a diagrammatic view illustrative of the operation of the mechanism and an alternative application of the same.

It is desirable to replenish the system with the operating fluid so as to compensate for any leakage through the power motor, or compressors. This can be conveniently done when $CO_2$ is used as the transmission fluid by collecting the $CO_2$ from the exhaust of the engine. An apparatus designed for this purpose is as follows: The engine is provided with a muffler 121. Exhaust gases are drawn off from the exhaust pipe 15, this being between the engine and the muffler so as to get any advantage of back pressure from the muffler. A pipe 122 leads through a cooling coil 122a to a filter 123 and a pipe 124 leads from the filter to the intake of a fan 125. A pipe 126 leads from the fan to a separator 127. The separator is connected by pipes 128 and 129 with the water pipes 45 and 50 respectively so that the separator is heated sufficiently to facilitate its operation. The separator may be of any well-known design, either physical or chemical. A suitable device is shown in Fig. 5 in which the separator 127 is divided into two chambers 127a and 127b and designed to circulate a liquid through said chambers as indicated by the arrows, heat being delivered through the coil 127c, the coil being connected with the pipes 128 and 129. A solution of a mixture of sodium carbonate and sodium bicarbonate is used, and as heated by the coil 127c gives off some of its contained carbon dioxide, forming some sodium carbonate from some of the sodium bicarbonate. This action is facilitated by the suction from the compressor intake pipe 131 leading from the chamber 127b. Bubbles of exhaust gases are continuously issuing from the end of the pipe 126 into the chamber 127a. Some of the carbon dioxide in this stream of exhaust gases is absorbed in the solution, forming sodium bicarbonate, the remainder being vented with the inert exhaust gases through the pipe 130, the sodium bicarbonate formed giving up, as before stated, its carbon dioxide in the chamber 127b, and which is taken off through the pipe 131 to a compressor 132. The compressor is driven by a shaft 133 from a shaft 135 through a clutch 134. The shaft 135 is driven by a gear 136 from a gear 136a on the starting motor shaft. The $CO_2$ is delivered from the compressor by way of a pipe 137 to the low pressure receiver 94, a check valve 137a being provided to prevent a return flow from the receiver. It will be understood that the fluid accumulated in the low pressure receiver in this manner is returned to the containers, or bottles 72 by the compressor 106 in the manner heretofore described.

Operation

It will be noted in this transmission system the engine effort is transmitted pneumatically directly to the driving motor without the interposition of receivers so that there is an immediate response of the driving motor to changes in effort of the engine. Consequently in the normal operation of the locomotive the engine throttle 18 affords the only necessary control. This will be understood if the engine and compressor set be regarded as a pump pumping fluid from a low reservoir to a high reservoir and the driving motor set as a motor discharging fluid from the high to the low reservoir with a constant quantity of fluid in circuit. It is evident that for a given engine and compressor speed the pressure difference, and hence the torque on the driving motor, quickly and automatically increases as the motor speed decreases. On the other hand the driving motor speed will increase with a given engine speed where the load conditions of the driving motor decrease. But in any case the full range of speed may be accomplished by a variation of speed of the engine which under similar load conditions will be directly reflected by the change of the driving motor speed. With this system, it will be noted also, that by reason of the high back-pressure and the great variation in pressure difference between the two sides of the system it is possible to use a constant medium late cut-off while obtaining ample operating flexibility with practically a minimum expansion card in the motor for starting yet with more and more complete expansion as the motor speed increases and the pressure difference drops. If, however, a constant cut-off is used, means should be preferably provided for avoiding over-expansion and this would also occur with faulty operation where a variable cut-off is used.

Figure 4:
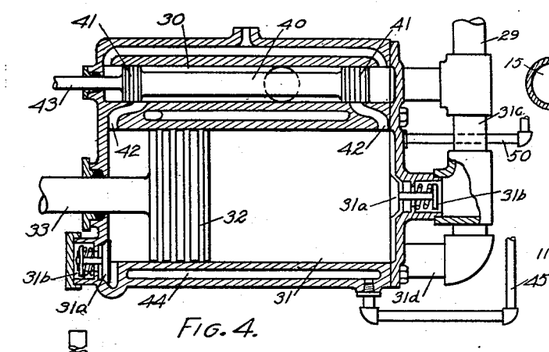
Fig. 4 a sectional view of the pneumatic motor.

I have, therefore, provided in the present device means for preventing over-expansion. This is illustrated in Fig. 4. Valves 31a lead from the ends of the cylinders into chambers 31b. These valves are of the check valve variety permitting flow into the cylinders but preventing flow outwardly. The chambers 31b are connected by pipes 31c and 31d with the low pressure side 29 of the transmission circuit. If, therefore, there is incipient over-expansion, fluid is immediately supplied to these valves from the low pressure side preventing such over-expansion and consequent work losses. While I have shown ordinary check valves, it will be understood that any sensitive valve of the compressor type may be used.

Figures 2B, 3, 10, 11:
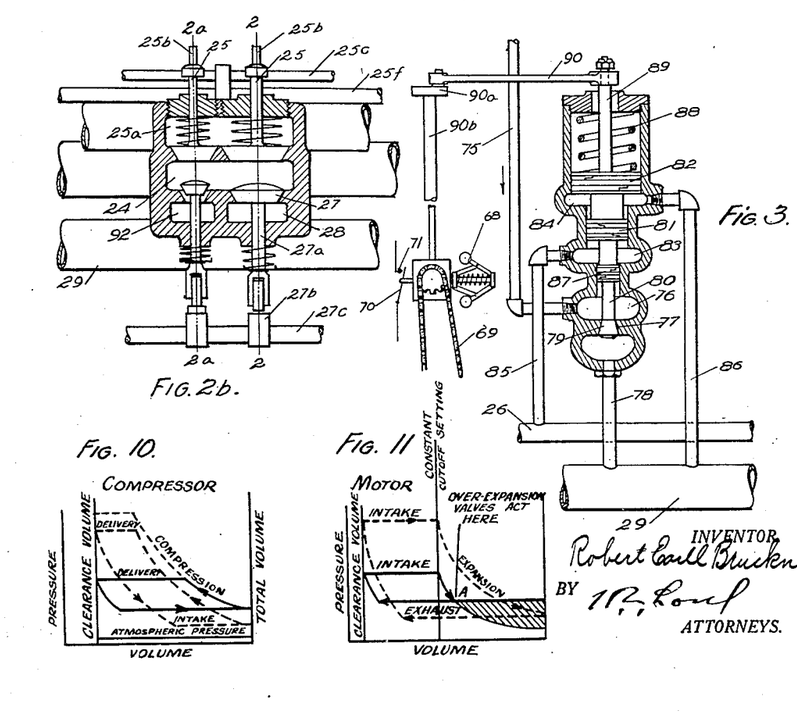
Fig. 2b a section on the line 2b—2b in Fig. 2.
Fig. 3 a sectional view of the constant fluid quantity controlling mechanism.
Fig. 10 a compressor diagram.
Fig. 11 a motor diagram.

These characteristics are illustrated by Fig. 10, which shows pressure-volume diagrams for the compressor, and by Fig. 11, which shows pressure-volume diagrams for the motor. The full-line pressure volume diagrams show the condition in which the motor is operating at low torque and high speed. The dotted diagrams show the condition in which the motor is operating at high torque and low speed, as when starting. The action of the over-expansion valves 31a is shown at A in Fig. 11, the shaded area showing the work otherwise lost.

It will be noted that the net work of the motor per revolution varies several hundred per cent, while the compressor work per revolution remains nearly constant at the optimum value for the given engine.

It will be understood that a variable cut-off is desired to get the maximum economy for differences in speed and torque. In the present system the total quantity of fluid remains constant in the transmission circuit. The maximum of economy is obtained by positioning the cut-off with relation to the working pressure difference for complete expansion. This point of cut-off can be readily established in the present system due to the fact that the mean pressure is constant by setting it with relation to this pressure difference.

In Fig. 9 I have shown diagrammatically a plurality of engines 138—138 delivering to driving motors 139 connected to a common load through a shaft 140. Fluid is conveyed from the engines through a connection 141 and returned through pipes 142, these pipes 141 and 142 corresponding to the pipes 26 and 29 of Fig. 1. The low pressure pipes 142 are coupled by a pipe 143. A gauge 144 indicates the high pressure and a gauge 145 the low pressure and a gauge 146 indicates the pressure difference. The differential gauge 146 is provided with two scales, 147 indicating the pressure difference and a scale 148 which designates cut-off settings for each pressure difference. Any variable cut-off valve mechanism commonly employed on locomotives, such as the Stephenson link may be used in connection with the motor, being connected as shown with the valve rod 43 (see Fig. 1). All that is necessary to obtain the proper cut-off setting for maximum economy is for the operator to set the cut-off to correspond with the pressure difference. It will be noted that the present system has a flexibility such that a plurality of engines of different sizes and speeds may be used operating upon the same driving motors substantially without change in the system.

It will be noted also that the direct connection between the compressor and the driving motor permits of the ready communication of the compressor heat to the driving motor thus preventing excessive low temperatures in the driving motor with the attendant lubricating and other troubles incident to such low temperature. This, in the present construction, is supplemented in the preferable form by the hot water circulating pipes extending to the jacket of the engine. This maintaining of the transmission fluid at a temperature preventing lubricating troubles both in the compressor and the driving motor is also supplemented by utilizing the engine piston as the piston for the compressor so that there is a direct heat transference from the engine to the compression side of the engine-and-compressor cylinder.

I prefer also to further lift the mean temperature of the transmission fluid in the closed circuit somewhat above atmospheric temperature by insulating the hot, or high pressure side while exposing the low pressure side to atmosphere or other heating medium. Such insulation is indicated at 149 (see Fig. 1).

By using expansible fluid under substantial pressure throughout the circuit, both in the high and low pressure sides it is possible to reduce the size of the compressor and still absorb the energy of the engine. This is because the volume ratio is comparatively small with a large pressure difference and this permits of a single-stage adiabatic compression with a large pressure difference. This makes possible the use of a compressor in which one end of the engine cylinder may be used for the compressor cylinder. This makes practical also a much higher compressor speed which is necessary to the practical operation of the engine. This high speed is not only facilitated by the nature of the compressor but by reason of the fact that the small volume ratio of compression gives a much longer open period to the outlet valves at the end of the compression stroke and also makes permissible a greater pressure difference at the two sides of the valves without objectionable loss. It is feasible, therefore, with this system to have a very much greater pressure drop between the high pressure and low pressure sides of the circuit with a comparatively simple single-stage mechanism.

While I have shown the compressor as formed directly in the engine cylinder and many of the advantages of my invention are dependent on such an arrangement it will be understood that in the broader aspects of the invention the compressor cylinder may be separated from the engine cylinder but preferably operated by the same reciprocating unit under the expansion of the engine fluid compressing the transmission fluid.

In order that the compressor may absorb the energy of the engine the quantity of transmission fluid should be maintained above a pre-determined minimum. The quantity controlling device which automatically supplies to the transmission circuit any losses of fluid assures the complete absorption of the engine energy at all times by the compressor. It will be noted that the compressor also has a comparatively large clearance space. This clearance space should be such as to permit of the operation of the engine with no delivery from the compressor. Thus it is possible in instantly stop the motor in an emergency through the throttle 58 and to permit the engine to continue running. This is of particular importance also in the present system in that the engine will continue to operate with a full energy output with wide pressure differences so that the torque on the driving motor may have wide variations dependent on the load upon the driving motor with a constant full load torque on the engine. It will be understood, of course, that when the pressure difference in the system reaches a point that there is no fluid delivery the engine will then operate at the idling torque and it is for this reason largely that the safety governor is provided so that if this condition arises the ignition may be cut off and the running away of the engine prevented. It will be observed that all of these features which tend to automatically accommodate conditions of service assist in reducing the necessity for operative skill.

$CO_2$ forms a desirable medium for the transmission system because it is non-explosive, non-poisonous, cheaply obtainable, and also non-corrosive even in the presence of air. It has a boiling point much below atmosphere and will not freeze in the piping. It has the great advantage that its critical temperature is above atmosphere so that it can be liquefied by pressure alone while its critical pressure is low so that it can be carried in bottles in liquid form at less than one thousand pound pressure. By reason of its critical temperature and pressure it can be readily used for starting because atmospheric heat readily vaporizes it. Where a combustion engine is used the waste gases from the engine itself form a ready source of supply for the liquid.

It will be observed that by merely reversing the valve mechanism of the driving motor I may have regenerative braking. The motor then acts as a compressor drawing fluid from the low pressure side of the transmission circuit through the exhaust port of the main valve and through the relief valves 31a and compressing this fluid into the high pressure side of the circuit through the inlet port of the main valve. This regenerative braking energy of compression should preferably be utilized. Where this is desired, this is accomplished by driving the starting motor 110 from the transmission circuit. This has already been explained as being accomplished by connecting the high pressure side 26 through the pipe 114, valve 115, valve 112, pipe 111 with the motor 110 and exhausting the motor through the pipe 116 to the pipe 29, the energy of the motor being used to pump fluid from the low pressure receiver 94 to the bottles 72 as heretofore described, or in operating the compressor 132 in delivering replenishing fluid to the low pressure receiver. It will be observed that during the regenerative braking no change is made in the valve controls of the starting motor and the auxiliary compressors over their setting for operation directly from the systems where the engine supplies the power so that in this respect the apparatus operates automatically.

Figure 7:
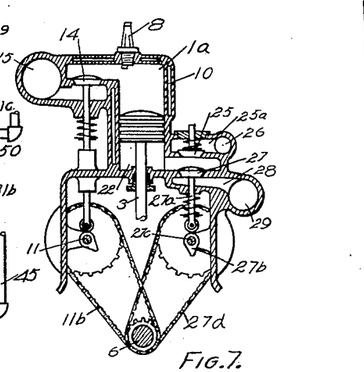
Fig. 7 a central section of an alternative form of engine.

In Fig. 7 I have shown the apparatus as adapted to a four cycle power engine. In this device the only difference in structure is that the exhaust 15a is omitted from its cylinder 1a the cam shafts are timed for revolution with every other rotation of the crank shaft as in ordinary four cycle practice and the inlet valve 27 remains closed during the idle stroke and thus in effect unloads the compressor for this stroke.

It may be desirable also instead of using the water heating system for the driving motor cylinder to provide for heating it with atmospheric air. Under such condition the chest and cylinder 30a and 31a are provided with ribs 30b facilitating heat transfer from the atmosphere to the walls of the chest and cylinder.

It will be noted that the clearance of the compressor should be such that a constant compressor torque will continue through quite a wide range of variation of pressure difference and, therefore, of motor torque due to the expansion of the clearance volume and a diminished delivery with increasing pressure differences and this constant compressor torque should be slightly below the available maximum engine torque as has been before described.

It will be noted that in the present instance the compression stroke of the piston with relation to the combustion chamber is accomplished through the direct pressure on the lower face of the piston by the low pressure transmission gases. Thus there is a distinct power saving in as much as the mechanical connections are relieved of the strain in affecting the compression of the combustion gases.

What I claim as new is:—

1. In a power transmitting apparatus, the combination of an internal combustion engine; a compressor driven by the engine, the compressor having a clearance without delivery creating only such back pressure as is overcome by the available torque of the engine; a motor; a normally closed pressure circuit between the compressor and motor;

means for maintaining the pressure in said circuit above atmospheric pressure; and means controlling the speed of the engine to control the speed of the motor.

2. In a power transmitting apparatus, the combination of an internal combustion engine; a compressor driven by the engine; a motor; a normally closed pressure circuit between the compressor and motor, said compressor having a clearance creating a constant compressor torque throughout a range of variation of motor torque and within the maximum torque of the engine; means for maintaining said pressure above atmospheric pressure; and means controlling the speed of the engine to control the speed of the motor.

3. In a power transmitting apparatus, the combination of an internal combustion engine; a compressor driven by the engine, the compressor having a clearance without delivery creating only such back pressure as is overcome by the available torque of the engine; a motor; a normally closed pressure circuit between the compressor and motor; means maintaining the pressure in said circuit above atmospheric pressure; means controlling the speed of the engine to control the speed of the motor; and a speed sensitive device stopping the engine at a predetermined speed.

4. In a power transmitting apparatus. the combination of an internal combustion engine comprising a reciprocating piston; a compressor comprising a reciprocating piston directly connected to the engine piston, a motor; a closed pressure gaseous fluid transmission circuit between the compressor and the motor; means maintaining the pressure in said circuit above atmospheric pressure.

5. In a power transmitting apparatus, the combination of an internal combustion engine comprising a cylinder and reciprocating piston; a compressor comprising a piston formed integrally with the engine piston and operating in the engine cylinder; and a closed pressure gaseous fluid transmission circuit between the compressor and the motor; means maintaining the pressure in said circuit above atmospheric pressure.

6. In a power transmitting apparatus, the combination of an internal combustion engine; a compressor driven by the engine; a motor; a normally closed pressure circuit between the compressor and motor; means maintaining the pressure in said circuit above atmospheric pressure; means braking the motor by the fluid forced reversely through the circuit by the compressing action of the motor when the motor is subject to driving force and means utilizing the fluid reversely driven for starting the engine.

7. In a power transmitting apparatus, the combination of an internal combustion engine; a compressor driven by the engine; a motor; a normally closed pressure circuit between the compressor and motor; means maintaining the pressure in said circuit above atmospheric pressure; means braking the motor by reversing the fluid in the circuit through the driving action of the motor; a starting motor; means circulating the fluid driven by the motor through the starting motor; and a compressor driven by the starting motor for starting the engine.

8. In a power transmitting apparatus, the combination of an internal combustion engine; a compressor driven by the engine; a motor; a normally closed pressure circuit between the compressor and motor; means maintaining the pressure in said circuit above atmospheric pressure; and means controlling the speed of the engine to control the speed of the motor; a liquid fluid supply containing means connected to the circuit; starting means receiving fluid from the liquid supply; and means for gasifying said starting fluid before expansion in the starting means.

9. In a power transmitting apparatus, the combination of an internal combustion engine; a compressor driven by the engine; a motor; a normally closed pressure circuit between the compressor and the motor; means maintaining the pressure in said circuit above atmospheric pressure; $CO_2$ in the circuit; means separating and collecting the $CO_2$ from the waste gases; and devices delivering the $CO_2$ collected to the circuit comprising a compressor driven by the fluid from the circuit.

10. In a power transmitting apparatus, the combination of an internal combustion engine; a compressor driven by the engine; a motor; a normally closed pressure circuit between the compressor and the motor; means maintaining the pressure in said circuit above atmospheric pressure; $CO_2$ in the circuit; means separating and collecting the $CO_2$ from the waste gases; devices delivering the $CO_2$ collected to the circuit comprising a compressor driven by the fluid from the circuit condensing the collected $CO_2$ to liquid form; and a liquid container for storing the $CO_2$ in liquid form.

11. In a power transmitting apparatus, the combination of a variable speed internal combustion engine; a compressor driven by the engine; a motor normally controlled by the control of the internal combustion engine; a normally closed pressure circuit between the compressor and motor; means maintaining the pressure in said circuit above atmospheric pressure; and means maintaining a constant quantity of transmission fluid in the circuit.

12. In a power transmitting apparatus, the combination of a variable speed internal combustion engine; a compressor driven by the engine; a motor normally controlled by the control of the internal combustion engine; a normally closed pressure circuit between the compressor and motor; means maintaining the pressure in said circuit above atmospheric pressure; and means maintaining a constant quantity of transmission fluid in the circuit comprising a means of supply connected to the circuit, a valve controlling said means, and pressure devices connected into both sides of the circuit, and controlling said valve.

13. In a power transmitting apparatus, the combination of a variable speed internal combustion engine; a compressor driven by the engine; a motor normally controlled by the control of the internal combustion engine; a normally closed pressure circuit between the compressor and motor; means maintaining the pressure in said circuit above atmospheric pressure; and means maintaining a constant quantity of transmission fluid in the circuit comprising a means of supply connected to the circuit, a valve controlling said means, and pressure devices connected into both sides of the circuit, said pressure devices being proportioned in relation to the interior volumes of the respective sides of the circuit and the sum of the total forces on said pressure devices acting to control the valve.

14. In a power transmitting apparatus, the combination of an internal combustion engine; a compressor driven by the engine; a motor; a normally closed pressure circuit between the compressor and motor; means maintaining the pressure in said circuit above atmospheric pressure; and automatic inlet valves opening from the low pressure side of the circuit to the motor to prevent over-expansion.

15. In a power transmitting apparatus, the combination of a variable speed internal combustion engine; a compressor driven by the engine; a motor normally controlled by the control of the internal combustion engine; a normally closed pressure circuit between the compressor and the motor; means maintaining the pressure in said circuit above atmospheric pressure; and means for maintaining the pressure of the transmission fluid at a mean value through the normal range of motor torque and speed sufficient to substantially balance the engine and compressor work per stroke.

16. In a power transmitting apparatus, the combination of an internal combustion engine; a compressor driven by the engine; a motor; a normally closed pressure circuit between the compressor and motor; means maintaining the pressure in said circuit above atmospheric pressure; means maintaining a constant quantity of fluid in said circuit; and a differential gauge indicating pressure difference between the high and low pressure sides of the circuit, said gauge being provided with a scale indicating a desirable cut-off for each pressure difference.

17. In a power transmitting apparatus, the combination of a combustion engine; a compressor driven by the engine; a gaseous fluid actuated motor; and a closed circuit between the compressor and the motor; means maintaining a pressure above atmospheric on the low pressure side of the circuit, said engine and compressor being directly connected and the intake stroke of the compressor being directly opposed to a compression stroke of the engine whereby the pressure of the low pressure side of the circuit operates to compress the combustion fluid.

18. In a power transmitting apparatus, the combination of a combustion engine; a compressor driven by the engine; a fluid actuated motor; a closed circuit between the compressor and the motor; and means responsive to pressure changes in the low pressure side of said circuit automatically maintaining a pressure above atmospheric on the low pressure side of the circuit, said engine and compressor being directly connected and the intake stroke of the compressor being directly opposed to a compression stroke of the engine whereby the pressure of the low pressure side of the circuit operates directly to compress the combustible fluid.

19. In a power transmitting apparatus, the combination of a combustion engine comprising a piston; a compressor comprising a piston integral with the engine piston and driven by the engine; a fluid actuated motor; a closed circuit between the compressor and the motor; and means responsive to pressure changes in the low pressure side of said circuit automatically maintaining a pressure above atmospheric on the low pressure side of the circuit, the intake stroke of the compressor being directly opposed to the compression stroke of the engine whereby the pressure of the low pressure side of the circuit operates directly to compress the engine fluid.

20. In a power transmitting apparatus, the combination of a combustion engine comprising a piston; a compressor comprising a piston directly coupled to and reciprocating with the engine piston and driven by the engine; a fluid actuated motor; a closed circuit between the compressor and the motor; and means responsive to pressure changes in the low pressure side of said circuit automatically maintaining a pressure above atmospheric on the low pressure side of the circuit, the intake stroke of the compressor being directly opposed to the compression stroke of the engine whereby the pressure of the low pressure side of the circuit operates directly to compress the engine fluid.

21. In a power transmitting apparatus, the combination of a combustion engine comprising a piston; a compressor driven by said engine and comprising a piston reciprocating as a common unit with said engine piston, said compressor having a clearance volume sufficient to permit idling operation of the engine-compressor with all delivery from the compressor stopped; a fluid-actuated motor; and a pressure conduit between said compressor and said motor, the intake stroke of the compressor being directly opposed to the compression stroke of the engine, whereby the fluid trapped in the clearance volume of said compressor performs a substantial part of the work of compressing the combustion fluid, directly by pushing on the common piston assembly.

22. In a power transmitting apparatus, the combination of an internal combustion engine; a compressor, said engine and compressor having a common integral piston with the same working area for the engine and compressor operating in a common cylinder; a motor; a normally closed pressure circuit between the compressor and the motor; means maintaining the pressure in said circuit above atmospheric pressure; and a non-combustible fluid in the circuit, said piston being actuated to compress the combustible fluid by the intake of fluid entering the compressor.

In testimony whereof I have hereunto set my hand.

ROBERT EARLL BRUCKNER.